(No Model.)

J. H. KNAPP.
PENCIL CASE.

No. 271,872. Patented Feb. 6, 1883.

WITNESSES:
Otto Hufeland
William Miller

INVENTOR
John H. Knapp.
BY Van Santvoord & Hauff
ATTORNEYS

UNITED STATES PATENT OFFICE.

JOHN H. KNAPP, OF NEW YORK, N. Y.

PENCIL-CASE.

SPECIFICATION forming part of Letters Patent No. 271,872, dated February 6, 1883.

Application filed August 16, 1882. (No model.)

*To all whom it may concern:*

Be it known that I, JOHN H. KNAPP, a citizen of the United States, residing at New York, in the county and State of New York, have invented new and useful Improvements in Pencil-Cases, of which the following is a specification.

This invention relates to improvements in extensible pencil-holders; and it consists in the combination of a pencil-case provided with an attached lead-propelling tube, an extension-tube arranged upon and in direct contact with the lead-propelling tube and adapted to slide longitudinally thereon independent of the lead-propelling tube, and an exterior shell, open at one end and closed at the other, into which shell the extension-tube and pencil-case are adapted to be inserted and entirely withdrawn.

The invention further consists of other features of combination, which will be hereinafter described, and pointed out in the claims.

Figure 1:
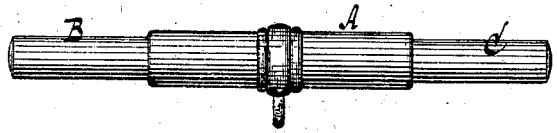
Figure 2:
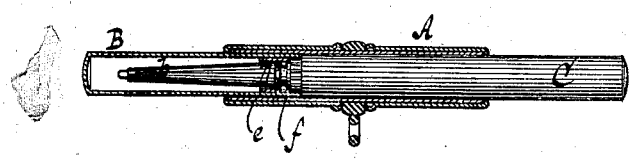
Figure 3:
Figure 4:
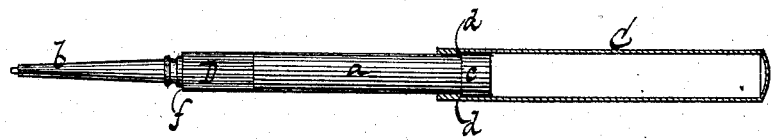
Figure 5:

In the accompanying drawings, Figure 1 represents a side view of my pencil-case when the same is inserted into the protecting-shell. Fig. 2 is a similar view, the protecting-shell being shown in section. Fig. 3 is a side view of the pencil-case when the extension-tube is drawn out. Fig. 4 is a similar view of the same, the extension-tube being shown in section. Fig. 5 is a sectional side view when the extension-tube is drawn out and inserted into the open end of the shell.

Similar letters indicate corresponding parts.

In the drawings, the letter A designates a tubular shell, which is open at one end, while its other end is closed by a cap, B, secured therein. Into the open end of the shell fits the extension-tube C, which is closed at one and open at its opposite end, and which is placed immediately upon the tube $a$ of the pencil-case D, said tube $a$ serving to propel the lead through the tube $b$ by mechanism generally used for this purpose. Near the rear end of the tube $a$ is formed a shoulder, $c$, which co-operates with a shoulder, $d$, formed near the open end of the extension-tube, (see Fig. 4,) so that a stop is formed which prevents the extension-tube from being drawn out beyond the desired point. The extension-tube C is made of such a diameter that it fits the open end of the shell A, and it is equal in diameter to the cap B, so that when the pencil-case is placed into the shell, Figs. 1 and 2, both ends of the shell have a uniform appearance. In the example shown in the drawings the cap B is made smaller in diameter than the body of the shell; but, if desired, the shell may be made of uniform diameter throughout, and in this case the outer end of the extension-tube will be enlarged, so that the diameter of this enlarged portion will be equal to that of the shell, while the main portion of the extension-tube fits the interior of the shell. In the interior of the cap B is secured a stop, $e$, and if the pencil-case is inserted into the shell A the shoulder $f$ of the pencil-case strikes this stop and prevents the point of the lead from being broken by coming in contact with the cap B. When the pencil-case is inserted into the shell, as shown in Fig. 2, the point of the lead is fully protected. When the pencil-case is withdrawn from the shell A, and the extension-tube is drawn out, the pencil can be used conveniently for writing, and if it is desired to obtain an additional length for the handle the extension-tube is inserted into the shell, as shown in Fig. 5. If the extension-tube is pushed in, and the pencil-case is inserted into the shell, the whole device can be conveniently carried in the vest-pocket; or the shell may be so constructed that it can be attached to the garment, and when the pencil-case is withdrawn and the extension-tube is drawn out, as shown in Figs. 3 and 4, the pencil can be used with convenience.

I am aware that pencil-cases have been made which fit a shell. In some cases the pencil-case is made with a pencil-tip-propelling device and with a lead-propelling device, and when the pencil-tip is drawn inward the pencil-case can be inserted into the shell. This device is much more expensive than that described above. In other cases the pencil-case is simply made with a lead-propelling device, and the shell is made telescopic. In this case, if the pencil-case is withdrawn from the shell the pencil cannot be used conveniently, while my pencil-case allows of using the pencil either with or without the shell.

What I claim as new, and desire to secure by Letters Patent, is—

1. The combination of the pencil-case D, provided at one end with an attached lead-propelling tube, $a$, an extension-tube, C, arranged upon and in contact with the lead-propelling tube and adapted to slide longitudinally thereon independent of any movement of the lead-propelling tube, and an exterior shell open at one end and closed at the other, into which shell the extension-tube and pencil-case are adapted to be inserted and entirely withdrawn, substantially as described.

2. The combination, with a shell which is open at one and closed at the opposite end, of a pencil-case having an extension-tube immediately upon the tube for propelling the lead, substantially as set forth.

In testimony whereof I have hereunto set my hand and seal in the presence of two subscribing witnesses.

JOHN H. KNAPP. [L. S.]

Witnesses:
 W. HAUFF,
 E. F. KASTENHUBER.